(12) United States Patent
Carey et al.

(10) Patent No.: US 7,867,130 B2
(45) Date of Patent: Jan. 11, 2011

(54) MULTI-SPEED TRANSMISSION

(75) Inventors: Clinton E. Carey, Highland, MI (US);
James M. Hart, Belleville, MI (US);
Scott H. Wittkopp, Ypsilanti, MI (US);
Andrew W. Phillips, Rochester, MI (US); Edwin T. Grochowski, Howell, MI (US); Elizabeth I. Wooden, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/826,196

(22) Filed: Jun. 29, 2010

(65) Prior Publication Data
US 2010/0267516 A1   Oct. 21, 2010

Related U.S. Application Data

(62) Division of application No. 11/746,396, filed on May 9, 2007, now Pat. No. 7,775,931.

(51) Int. Cl.
*F16H 3/62* (2006.01)
(52) U.S. Cl. ............................... 475/277; 475/282
(58) Field of Classification Search ............ 475/275, 475/277, 282, 288, 311, 317
See application file for complete search history.

(56) References Cited

U.S. PATENT DOCUMENTS

| | | | |
|---|---|---|---|
| 6,558,287 B2 | 5/2003 | Hayabuchi |
| 6,634,981 B1 | 10/2003 | Raghavan |
| 6,648,790 B2 | 11/2003 | Raghavan |
| 6,659,903 B1 | 12/2003 | Bucknor |
| 6,659,904 B1 | 12/2003 | Usoro |
| 6,709,360 B2 | 3/2004 | Raghavan |
| 6,746,360 B2 | 6/2004 | Bucknor |
| 6,887,178 B2 | 5/2005 | Miyazaki |
| 6,910,985 B2 | 6/2005 | Ishimaru |
| 6,913,556 B2 | 7/2005 | Armstrong |
| 6,923,742 B2 | 8/2005 | Armstrong |
| 6,929,576 B2 | 8/2005 | Armstrong |
| 6,949,048 B2 | 9/2005 | Bucknor |
| 6,960,150 B2 | 11/2005 | Armstrong |
| 6,962,548 B2 | 11/2005 | Bucknor |
| 7,014,590 B2 | 3/2006 | Stevenson |
| 7,029,416 B2 | 4/2006 | Miyazaki |
| 7,033,299 B2 | 4/2006 | Bucknor |
| 7,059,995 B2 | 6/2006 | Stevenson |
| 7,074,153 B2 | 7/2006 | Usoro |
| 7,081,066 B2 | 7/2006 | Raghavan |
| 7,094,173 B2 | 8/2006 | Raghavan |
| 7,101,303 B2 | 9/2006 | Tiesler |
| 7,101,305 B2 | 9/2006 | Tabata |
| 7,104,915 B2 | 9/2006 | Tiesler |
| 7,115,061 B2 | 10/2006 | Tiesler |
| 7,115,063 B2 | 10/2006 | Tiesler |
| 7,118,509 B2 | 10/2006 | Tabata |
| 7,118,510 B2 | 10/2006 | Raghavan |
| 7,118,511 B2 | 10/2006 | Tiesler |
| 7,137,923 B2 | 11/2006 | Tiesler |
| 7,150,695 B2 | 12/2006 | Usoro |
| 7,150,696 B2 | 12/2006 | Bucknor |
| 7,156,767 B2 | 1/2007 | Tiesler |

(Continued)

*Primary Examiner*—David D Le
*Assistant Examiner*—Edwin A. Young

(57) ABSTRACT

A transmission is provided having an input member, an output member, four planetary gear sets, a plurality of coupling members and a plurality of torque transmitting devices. Each of the planetary gear sets includes a sun gear member, a planet carrier member, and a ring gear member. The torque transmitting devices include clutches and brakes arranged within a transmission housing.

25 Claims, 8 Drawing Sheets

U.S. PATENT DOCUMENTS

| | | |
|---|---|---|
| 7,156,768 B2 | 1/2007 | Gumpoltsberger |
| 7,608,008 B2 * | 10/2009 | Seo .................. 475/276 |
| 2004/0082425 A1 | 4/2004 | Lee et al. |
| 2005/0282680 A1 | 12/2005 | Soh |
| 2006/0068965 A1 | 3/2006 | Gumpoltsberger |
| 2007/0010367 A1 | 1/2007 | Raghavan |
| 2007/0010369 A1 | 1/2007 | Bucknor |
| 2007/0010370 A1 | 1/2007 | Raghavan |
| 2008/0085806 A1 | 4/2008 | Wittkopp et al. |
| 2008/0085807 A1 | 4/2008 | Wittkopp et al. |
| 2008/0085808 A1 | 4/2008 | Hart et al. |
| 2008/0085809 A1 | 4/2008 | Wittkopp et al. |
| 2008/0085810 A1 | 4/2008 | Hart et al. |
| 2008/0085811 A1 | 4/2008 | Hart et al. |
| 2008/0085812 A1 | 4/2008 | Wittkopp et al. |
| 2008/0085813 A1 | 4/2008 | Hart et al. |
| 2008/0283684 A1 | 11/2008 | Hazelton |

* cited by examiner

| CLUTCH | ZONE LOCATION | | | | | |
|---|---|---|---|---|---|---|
| | A | B | C | D | E | F |
| B1 | X | X | X | | X | X |
| B2 | X | X | X | | X | X |
| C1 | X | X | X | | | X |
| C2 | X | X | | | X | X |
| C3 | X | | | X | | X |

| CLUTCH | ZONE LOCATION | | | | | |
|---|---|---|---|---|---|---|
| | A | B | C | D | E | F |
| B1 | X | | | | | X |
| B2 | X | | | | X | X |
| C1 | X | X | X | | | X |
| C2 | X | X | | | | X |
| C3 | X | | | | | X |

MULTI-SPEED TRANSMISSION

CROSS-REFERENCE TO RELATED APPLICATIONS

This patent application is a divisional application of U.S. patent application Ser. No. 11/746,396, filed May 9, 2007, which, in turn, claims the benefit of U.S. provisional patent application Ser. No. 60/895,411, filed on Mar. 16, 2007. The disclosure of the above application is incorporated herein by reference.

FIELD

The invention relates generally to a multiple speed transmission having a plurality of planetary gear sets and a plurality of torque transmitting devices and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, a plurality of planetary gear sets, and a plurality of torque-transmitting mechanisms. The plurality of planetary gear sets each have a sun gear member, a planetary carrier member, and a ring gear member.

In one aspect of the present invention, four of the gear sets are simple planetary gear sets.

In another aspect of the present invention, two of the plurality of torque transmitting mechanisms are brakes.

In another aspect of the present invention, three of the torque transmitting mechanisms are friction clutches.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1A, 1B:
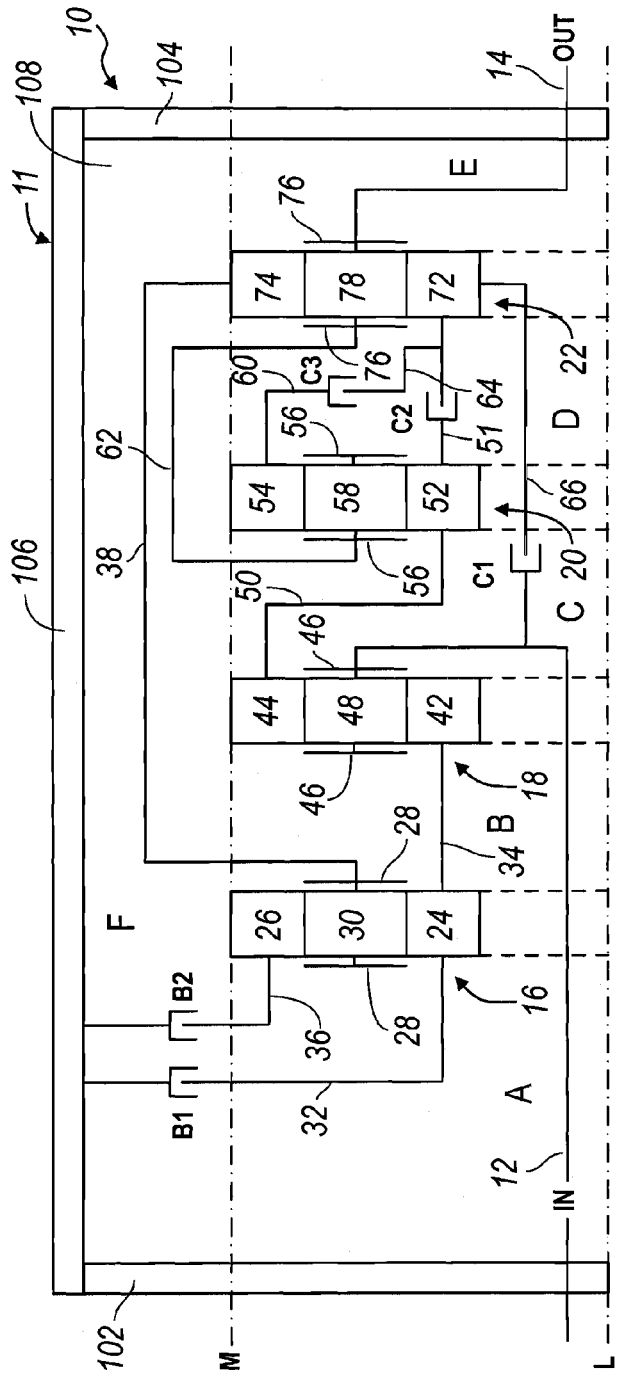
FIG. 1A is a schematic diagram of a transmission according to the principles of the present invention.
FIG. 1B is a chart showing feasible locations of the torque transmitting devices for the arrangement of the transmission shown in FIG. 1A.

Referring now to FIG. 1A, an embodiment of a multi-speed or eight speed transmission is generally indicated by reference number 10. The transmission 10 is illustrated as a rear-wheel drive or longitudinal transmission, though various other types of transmission configurations may be employed. The transmission 10 includes a transmission housing 11, an input shaft or member 12, and an output shaft or member 14. The input member 12 is continuously connected to an engine (not shown) or to a turbine of a torque converter (not shown). The output member 14 is continuously connected with a final drive unit (not shown) or transfer case (not shown).

The transmission 10 includes a first planetary gear set 16, a second planetary gear set 18, a third planetary gear set 20, and a fourth planetary gear set 22. The planetary gear sets 16, 18, 20 and 22 are connected between the input member 12 and the output member 14. In a preferred embodiment of the present invention, the planetary gear set 16 includes a sun gear member 24, a ring gear member 26, and a planet carrier member 28 that rotatably supports a set of planet or pinion gears 30 (only one of which is shown). The pinion gears 30 are configured to intermesh with the sun gear member 24 and the ring gear member 26. The sun gear member 24 is connected for common rotation with a first shaft or intermediate member 32 and a second shaft or intermediate member 34. It should be appreciated that the first intermediate member 32 is connected for common rotation with the second intermediate member 34 and that the intermediate members 32 and 34 may form one single shaft or multiple shafts through one or more members of the planetary gear sets, as seen throughout the several views. The ring gear member 26 is connected for common rotation with a third shaft or intermediate member 36. The planet carrier member 28 is connected for common rotation with a fourth shaft or intermediate member 38.

The planetary gear set 18 includes a sun gear member 42, a ring gear member 44, and a planet carrier member 46 that rotatably supports a set of planet or pinion gears 48. The pinion gears 48 are configured to intermesh with the sun gear member 42 and the ring gear member 44. The sun gear member 42 is connected for common rotation with the second intermediate member 34. The ring gear member 44 is connected for common rotation with a fifth shaft or intermediate member 50. The planet carrier member 46 is connected for common rotation with the input member 12.

The planetary gear set 20 includes a sun gear member 52, a ring gear member 54, and a carrier member 56 that rotatably supports a set of planet or pinion gears 58. The pinion gears 58 are configured to intermesh with the sun gear member 52 and the ring gear member 54. The sun gear member 52 is connected for common rotation with the fifth shaft or intermediate member 50 and with a sixth shaft or intermediate member 51. It should be appreciated that the fifth intermediate member 50 is connected for common rotation with the sixth intermediate member 51 and that the intermediate members 50 and 51 may form one single shaft or multiple shafts through one or more members of the planetary gear sets, as seen throughout the several views. The ring gear member 54 is connected for common rotation with a seventh shaft or intermediate member 60. The planet carrier member 56 is connected for common rotation with an eighth shaft or intermediate member 62. It should be appreciated that the eighth intermediate member 62 is connected for common rotation with the output member 14 and that the eighth intermediate members 62 and the output member 14 may form one single shaft or multiple shafts through one or more members of the planetary gear sets, as seen throughout the several views.

The planetary gear set 22 includes a sun gear member 72, a ring gear member 74, and a planet carrier member 76 that rotatably supports a set of planet or pinion gears 78. The pinion gears 78 are configured to intermesh with the sun gear member 72 and the ring gear member 74. The sun gear member 72 is connected for common rotation with a ninth shaft or intermediate member 64 and a tenth shaft or intermediate member 66. It should be appreciated that the ninth intermediate member 64 is connected for common rotation with the tenth intermediate member 66 and that the intermediate members 64 and 66 may form one single shaft or multiple shafts through one or more members of the planetary gear sets, as seen throughout the several views. The ring gear member 74 is connected for common rotation with the fourth intermediate member 38. The planet carrier member 76 is connected for common rotation with the output member 14 and with the eighth intermediate member 62.

The transmission 10 includes a variety of torque-transmitting mechanisms or devices including a first intermediate clutch C1, a second intermediate clutch C2, a third intermediate clutch C3, a first brake B1 and a second brake B2. The first intermediate clutch C1 is selectively engagable to connect the input member 12 to the tenth intermediate member 66. Alternatively, the first intermediate clutch C1 may be connected to the input member 12 through the planet carrier member 46, as seen throughout the several views. The second intermediate clutch C2 is selectively engagable to connect the sixth intermediate member 51 to the ninth intermediate member 64. The third intermediate clutch C3 is selectively engagable to connect the seventh intermediate member 60 to the ninth intermediate member 64. The brake B1 is selectively engagable to connect the first intermediate member 32 to the transmission housing 11 to restrict rotation of the first intermediate member 32 relative to the transmission housing 11. Finally, the brake B2 is selectively engagable to connect the third intermediate member 36 to the transmission housing 11 to restrict rotation of the third intermediate member 36 relative to the transmission housing 11.

The transmission 10 is capable of transmitting torque from the input member 12 to the output member 14 in at least eight forward torque ratios and one reverse torque ratio. Each of the forward torque ratios and the reverse torque ratio are attained by engagement of one or more of the torque-transmitting mechanisms (i.e. first intermediate clutch C1, second intermediate clutch C2, third intermediate clutch C3, brake B1 and brake B2). Those skilled in the art will readily understand that a different speed ratio is associated with each torque ratio. Thus, eight forward speed ratios may be attained by the transmission 10.

The transmission housing 11 includes a first end wall 102, a second end wall 104, and a third wall 106. The third wall 106 interconnects between the first and second end walls 102 and 104 to provide a space or cavity 108 in which planetary gear sets 16, 18, 20, and 22 and the torque-transmitting mechanisms C1, C2, C3, B1, and B2 are located. Further, the cavity 108 has a plurality of areas or Zones A, B, C, D, E, and F in which the plurality of torque transmitting mechanisms C1, C2, C3, B1, and B2 will be specifically positioned, in accordance with the preferred embodiments of the present invention.

As shown in FIG. 1A and throughout the several views, Zone A is defined by the area or space bounded: axially on the left by the first end wall 102, on the right by planetary gear set 16, radially inward by a reference line "L" which is a longitudinal line that is axially aligned with the input shaft 12, and radially outward by a reference line "M" which is a longitudinal line that extends adjacent an outer diameter or outer periphery of the planetary gear sets 16, 18, 20, and 22. While reference line "M" is illustrated as a straight line throughout the several views, it should be appreciated that reference line "M" follows the outer periphery of the planetary gear sets 16, 18, 20, and 22, and accordingly may be stepped or non-linear depending on the location of the outer periphery of each of the planetary gear sets 16, 18, 20, and 22. Zone B is defined by the area bounded: axially on the left by planetary gear set 16, axially on the right by the planetary gear set 18, radially outward by reference line "M", and radially inward by reference line "L". Zone C is defined by the area bounded: axially on the left by the planetary gear set 18, axially on the right by the planetary gear set 20, radially outward by reference line "M", and radially inward by reference line "L". Zone D is defined by the area bounded: axially on the left by the planetary gear set 20, axially on the right by the planetary gear set 22, radially outward by reference line "M", and radially inward by reference line "L". Zone E is defined by the area bounded: axially on the left by the planetary gear set 22, axially on the right by the second end wall 104, radially outward by reference line "M", and radially inward by reference line "L". Zone F is defined by the area bounded: axially on the left by the first end wall 102, axially on the right by the second end wall 104, radially inward by reference line "M" and radially outward by the third wall 106. As will be described and illustrated hereinafter, planetary gear sets 16, 18, 20, and 22 will change positions within the transmission cavity 108, however, the Zones described above will not change and will remain the same as shown throughout the Figures.

In the arrangement of the transmission 10 shown in FIG. 1A, the planetary gear sets 16, 18, 20, and 22 are longitudinally arranged in the following order from left to right: 16-18-20-22. Specifically, the planetary gear set 16 is disposed closest to the wall 102, the planetary gear set 22 is disposed closest to the wall 104, the planetary gear set 18 is adjacent the planetary gear set 16, and the planetary gear set 20 is disposed between the planetary gear sets 18 and 22. The torque-transmitting mechanisms are intentionally located within specific Zones in order to provide advantages in overall transmission size, packaging efficiency, and reduced manufacturing complexity. In the particular example shown in FIG. 1A, the torque-transmitting mechanism C1 is disposed within Zone C, the torque-transmitting mechanisms C2 and C3 are disposed within Zone D, and the torque-transmitting mechanisms B1 and B2 are disposed within Zone F.

However, the present invention contemplates other embodiments where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 1B. An "X" in the chart indicates that the present invention contemplates locating the particular torque-transmitting device in any of the referenced Zones.

Figures 1C, 1D:
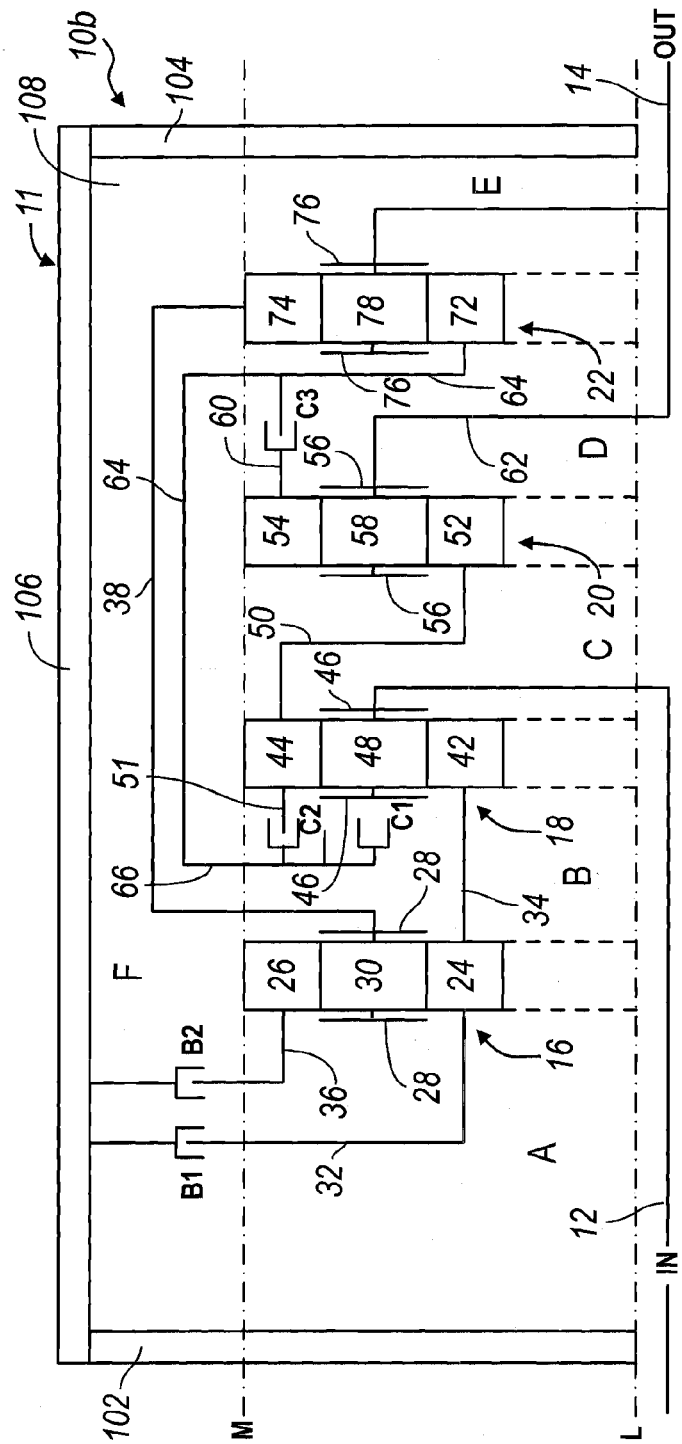
FIG. 1C is a schematic diagram of another arrangement of the transmission according to the principles of the present invention.
FIG. 1D is a chart showing feasible locations of the torque transmitting devices for the arrangement of the transmission shown in FIG. 1C.

With reference to FIG. 1C, an alternate embodiment of the multi-speed transmission is indicated by reference number 10B. The transmission 10B includes the planetary gear sets 16, 18, 20, and 22 and the torque-transmitting mechanisms C1, C2, C3, B1, and B2. The various components and connecting shafts that are identical with the transmission 10 in FIG. 1A have the same numerical designation.

The transmission 10B includes the planetary gear sets 16, 18, 20, and 22 longitudinally arranged identically to the arrangement shown in FIG. 1A. However, in the particular example shown in FIG. 1C, the torque-transmitting mechanisms C1 and C2 are disposed within Zone B. As in the previous embodiment, the torque-transmitting mechanism C3 is disposed within Zone D and the torque-transmitting mechanisms B1 and B2 are disposed within Zone F.

Additionally, the present invention contemplates other embodiments of transmission 10B where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 1D. An "X" in the chart indicates that the present invention contemplates locating the particular torque-transmitting device in any of the referenced Zones.

Figures 2A, 2B:
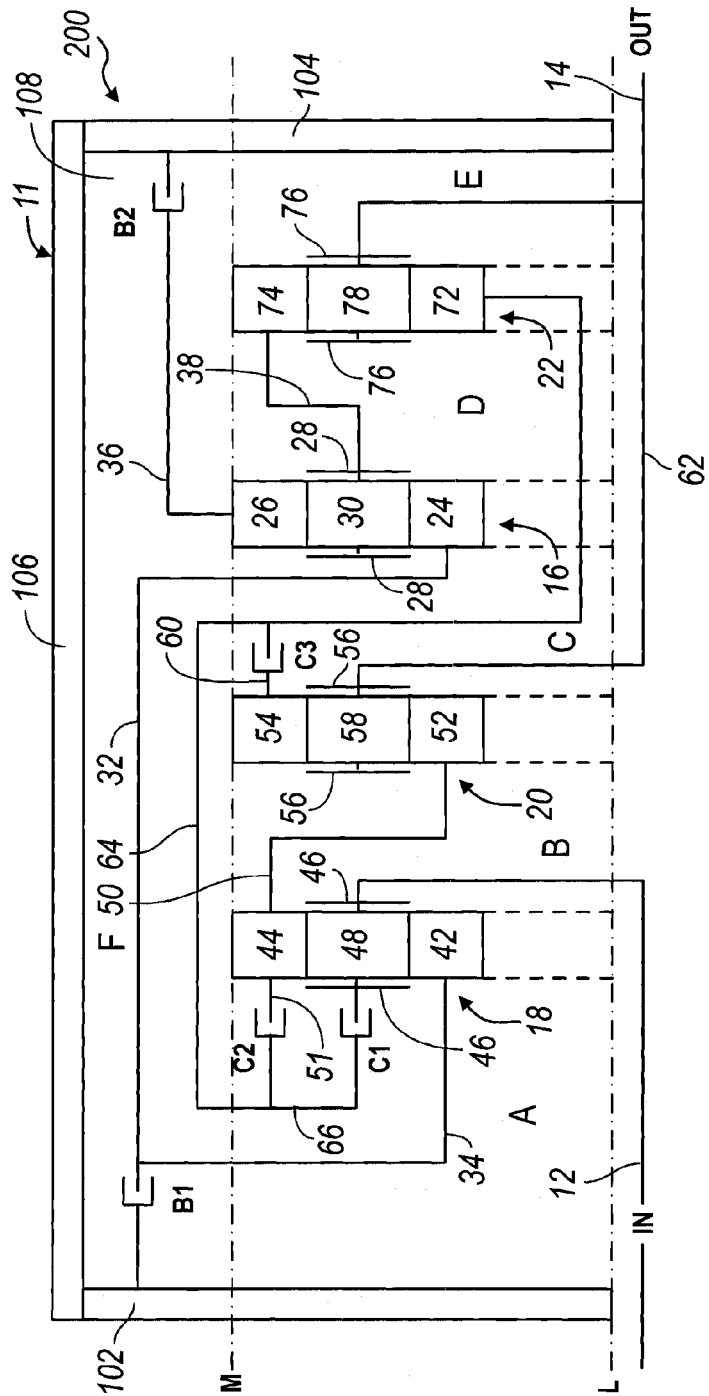
FIG. 2A is a schematic diagram of still another arrangement of the transmission according to the principles of the present invention.
FIG. 2B is a chart showing feasible locations of the torque transmitting devices for the arrangement of the transmission shown in FIG. 2A.

Turning now to FIG. 2A, still another embodiment of the multi-speed transmission is indicated by reference number 200. The transmission 200 includes the planetary gear sets 16, 18, 20, and 22 and the torque-transmitting mechanisms C1, C2, C3, B1, and B2. The various components and connecting shafts that are identical with the transmission 10 in FIG. 1A have the same numerical designation in FIG. 2A.

The transmission 200 includes the planetary gear sets 16, 18, 20, and 22 longitudinally arranged in the following order from left to right: 18-20-16-22. Specifically, the planetary gear set 18 is disposed closest to the wall 102, the planetary gear set 22 is disposed closest to the wall 104, the planetary gear set 20 is adjacent the planetary gear set 18, and the planetary gear set 16 is disposed between the planetary gear sets 20 and 22. The torque-transmitting mechanisms are intentionally located within specific Zones in order to provide advantages in overall transmission size, packaging efficiency, and reduced manufacturing complexity. In the particular example shown in FIG. 2A, the torque-transmitting mechanisms C1 and C2 are disposed within Zone A, the torque-transmitting mechanism C3 is disposed within Zone C, and the torque-transmitting mechanisms B1 and B2 are disposed within Zone F.

However, the present invention contemplates other embodiments of the transmission 200 where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 2B. An "X" in the chart indicates that the present invention contemplates locating the particular torque-transmitting device in any of the referenced Zones.

Figures 3A, 3B:
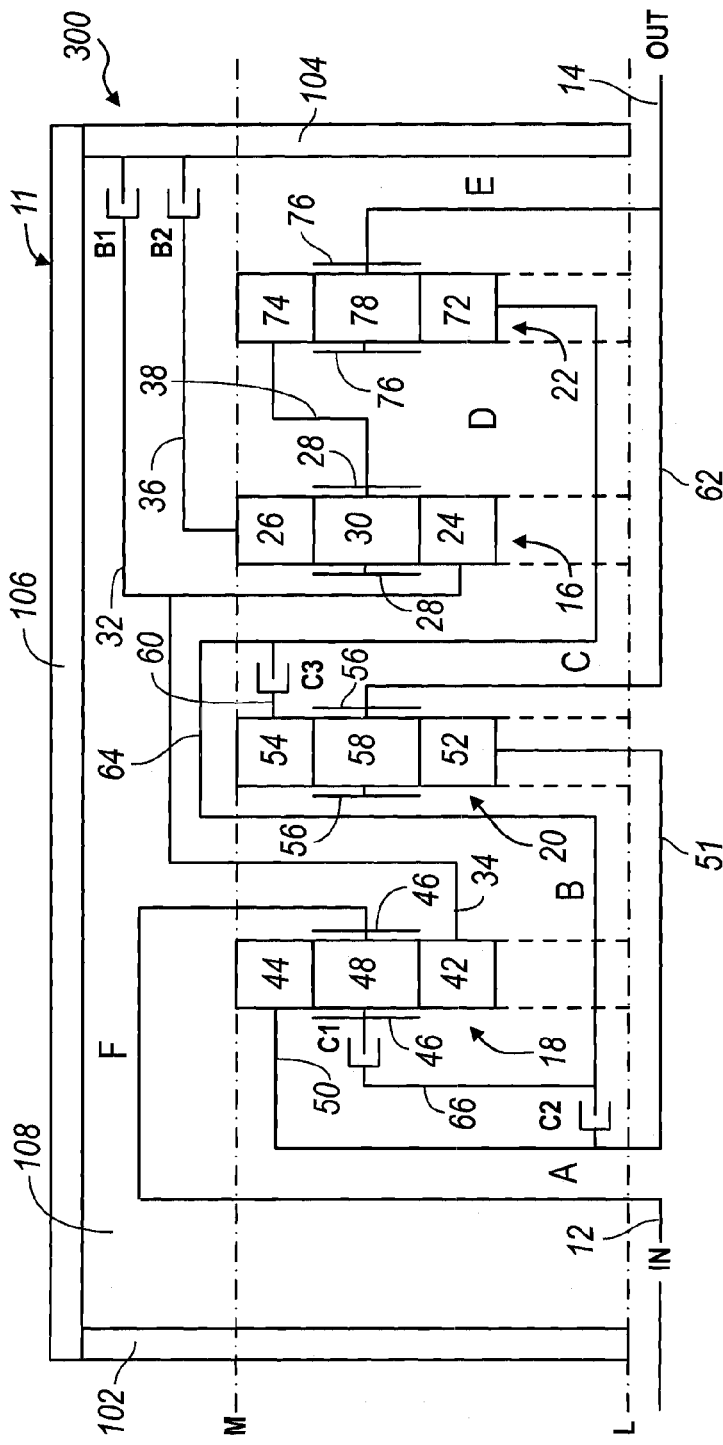
FIG. 3A is a schematic diagram of still another arrangement of the transmission according to the principles of the present invention.
FIG. 3B is a chart showing feasible locations of the torque transmitting devices for the arrangement of the transmission shown in FIG. 3A.

With reference to FIG. 3A, still another embodiment of the multi-speed transmission is indicated by reference number 300. The transmission 300 includes the planetary gear sets 16, 18, 20, and 22 and the torque-transmitting mechanisms C1, C2, C3, B1, and B2. The various components and connecting shafts that are identical with the transmission 10 in FIG. 1A have the same numerical designation in FIG. 3A.

The transmission 300 includes the planetary gear sets 16, 18, 20, and 22 longitudinally arranged identically to the arrangement shown in FIG. 2A. However, the input shaft 12 is arranged such that it crosses the boundary between Zones A and F. In the particular example shown in FIG. 3A, the torque-transmitting mechanisms C1 and C2 are disposed within Zone A, the torque-transmitting mechanism C3 is disposed within Zone C, and the torque-transmitting mechanisms B1 and B2 are disposed within Zone F.

However, the present invention contemplates other embodiments of the transmission 300 where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 3B. An "X" in the chart indicates that the present invention contemplates locating the particular torque-transmitting device in any of the referenced Zones.

Figures 4A, 4B:
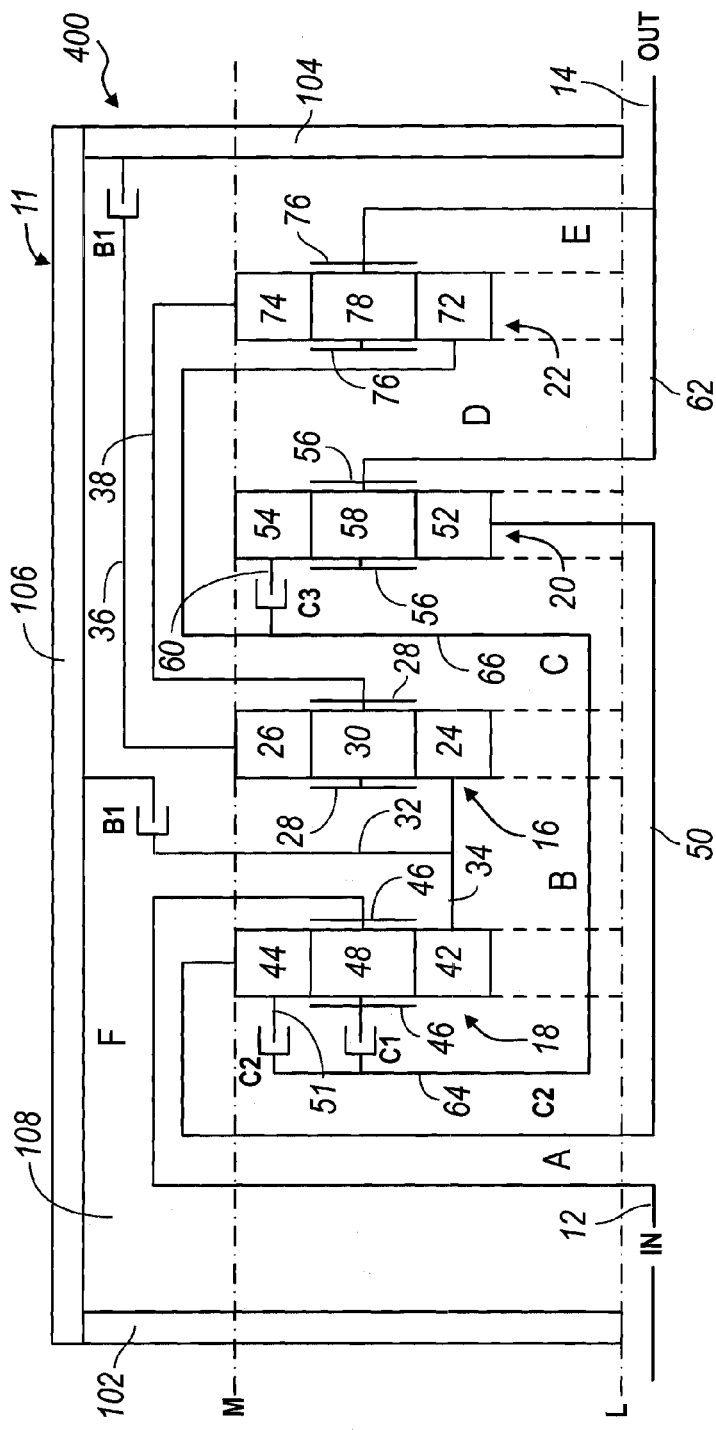
FIG. 4A is a schematic diagram of still another arrangement of the transmission according to the principles of the present invention.
FIG. 4B is a chart showing feasible locations of the torque transmitting devices for the arrangement of the transmission shown in FIG. 4A.

With reference to FIG. 4A, still another embodiment of the multi-speed transmission is indicated by reference number 400. The transmission 400 includes the planetary gear sets 16, 18, 20, and 22 and the torque-transmitting mechanisms C1, C2, C3, B1, and B2. The various components and connecting shafts that are identical with the transmission 10 in FIG. 1A have the same numerical designation in FIG. 4A.

The transmission 400 includes the planetary gear sets 16, 18, 20, and 22 longitudinally arranged in the following order from left to right: 18-16-20-22. Specifically, the planetary gear set 18 is disposed closest to the wall 102, the planetary gear set 22 is disposed closest to the wall 104, the planetary gear set 16 is adjacent the planetary gear set 18, and the planetary gear set 20 is disposed between the planetary gear sets 16 and 22. The torque-transmitting mechanisms are intentionally located within specific Zones in order to provide advantages in overall transmission size, packaging efficiency, and reduced manufacturing complexity. In the particular example shown in FIG. 4A, the torque-transmitting mechanisms C1 and C2 are disposed within Zone A, the torque-transmitting mechanism C3 is disposed within Zone C, and the torque-transmitting mechanisms B1 and B2 are disposed within Zone F.

However, the present invention contemplates other embodiments of the transmission 400 where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 4B. An "X" in the chart indicates that the present invention contemplates locating the particular torque-transmitting device in any of the referenced Zones.

Figures 5A, 5B:
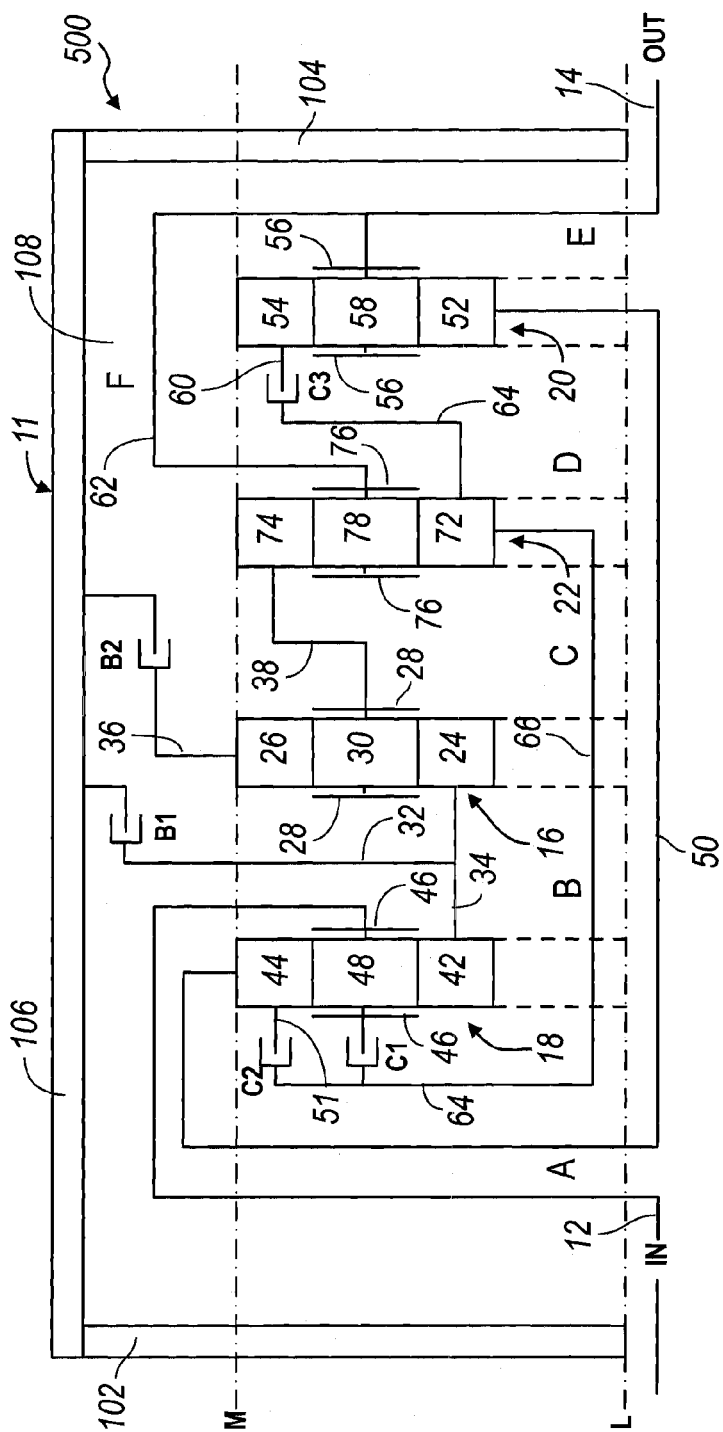
FIG. 5A is a schematic diagram of still another arrangement of the transmission according to the principles of the present invention.
FIG. 5B is a chart showing feasible locations of the torque transmitting devices for the arrangement of the transmission shown in FIG. 5A.

With reference to FIG. 5A, still another embodiment of the multi-speed transmission is indicated by reference number 500. The transmission 500 includes the planetary gear sets 16, 18, 20, and 22 and the torque-transmitting mechanisms C1, C2, C3, B1, and B2. The various components and connecting shafts that are identical with the transmission 10 in FIG. 1A have the same numerical designation in FIG. 5A.

The transmission 500 includes the planetary gear sets 16, 18, 20, and 22 longitudinally arranged in the following order from left to right: 18-16-22-20. Specifically, the planetary gear set 18 is disposed closest to the wall 102, the planetary gear set 20 is disposed closest to the wall 104, the planetary gear set 16 is adjacent the planetary gear set 18, and the planetary gear set 22 is disposed between the planetary gear sets 16 and 20. The torque-transmitting mechanisms are intentionally located within specific Zones in order to provide advantages in overall transmission size, packaging efficiency, and reduced manufacturing complexity. In the particular example shown in FIG. 5A, the torque-transmitting mechanisms C1 and C2 are disposed within Zone A, the torque-transmitting mechanism C3 is disposed within Zone D, and the torque-transmitting mechanisms B1 and B2 are disposed within Zone F.

However, the present invention contemplates other embodiments of the transmission 500 where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 5B. An "X" in the chart indicates that the present invention contemplates locating the particular torque-transmitting device in any of the referenced Zones.

Figures 6A, 6B:
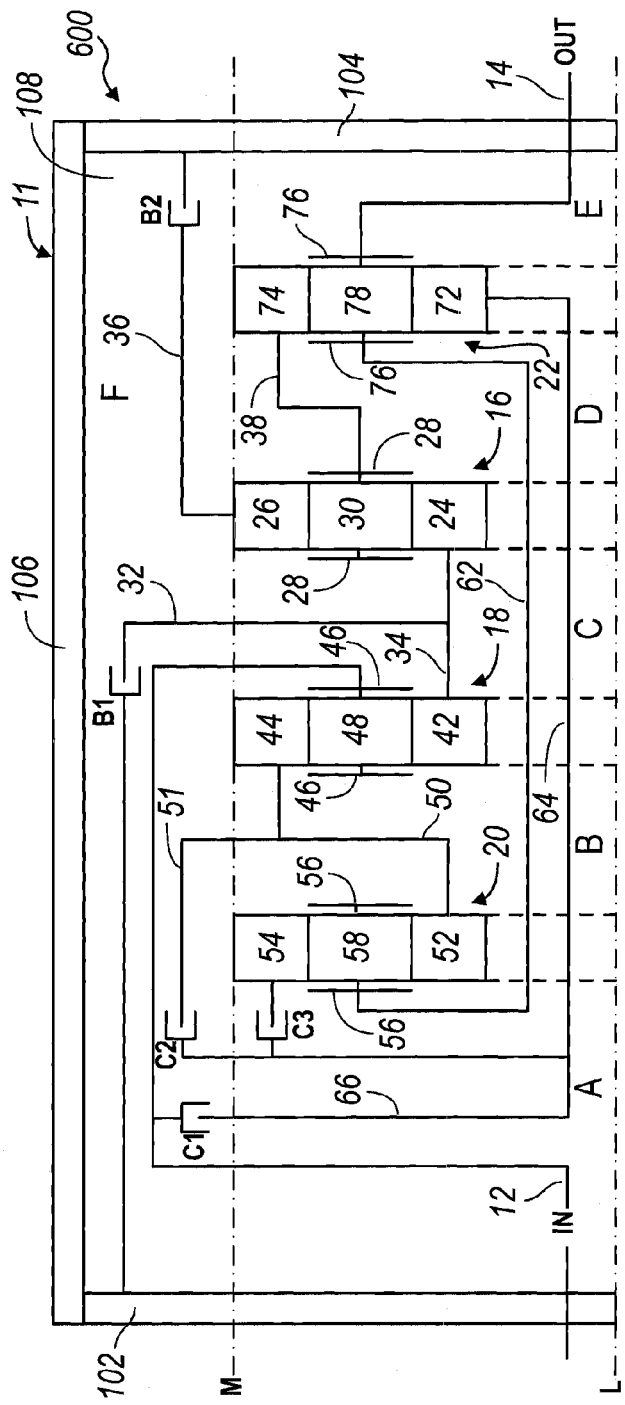
FIG. 6A is a schematic diagram of still another arrangement of the transmission according to the principles of the present invention.
FIG. 6B is a chart showing feasible locations of the torque transmitting devices for the arrangement of the transmission shown in FIG. 6A.

With reference to FIG. 6A, still another embodiment of the multi-speed transmission is indicated by reference number 600. The transmission 600 includes the planetary gear sets 16, 18, 20, and 22 and the torque-transmitting mechanisms C1, C2, C3, B1, and B2. The various components and connecting shafts that are identical with the transmission 10 in FIG. 1A have the same numerical designation in FIG. 6A.

The transmission 600 includes the planetary gear sets 16, 18, 20, and 22 longitudinally arranged in the following order from left to right: 20-18-16-22. Specifically, the planetary gear set 20 is disposed closest to the wall 102, the planetary gear set 22 is disposed closest to the wall 104, the planetary gear set 18 is adjacent the planetary gear set 20, and the planetary gear set 16 is disposed between the planetary gear sets 18 and 22. The torque-transmitting mechanisms are intentionally located within specific Zones in order to provide advantages in overall transmission size, packaging efficiency, and reduced manufacturing complexity. In the particular example shown in FIG. 6A, the torque-transmitting mechanisms C1, C2, B1, and B2 are disposed within Zone F, and the torque-transmitting mechanism C3 is disposed within Zone A.

However, the present invention contemplates other embodiments of the transmission 600 where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 6B. An "X" in the chart indicates that the present invention contemplates locating the particular torque-transmitting device in any of the referenced Zones.

Figures 7A, 7B:
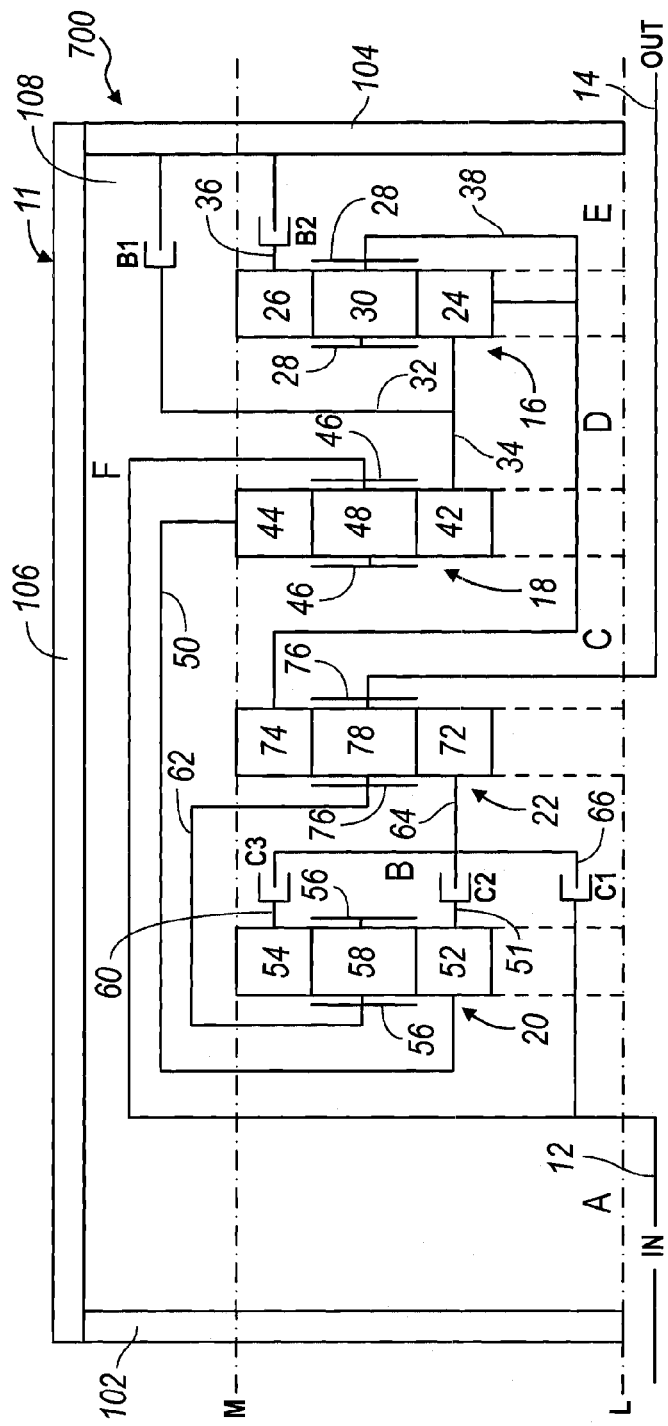
FIG. 7A is a schematic diagram of still another arrangement of the transmission according to the principles of the present invention.
FIG. 7B is a chart showing feasible locations of the torque transmitting devices for the arrangement of the transmission shown in FIG. 7A.

With reference to FIG. 7A, still another embodiment of the multi-speed transmission is indicated by reference number 700. The transmission 700 includes the planetary gear sets 16, 18, 20, and 22 and the torque-transmitting mechanisms C1, C2, C3, B1, and B2. The various components and connecting shafts that are identical with the transmission 10 in FIG. 1A have the same numerical designation in FIG. 7A.

The transmission 700 includes the planetary gear sets 16, 18, 20, and 22 longitudinally arranged in the following order from left to right: 20-22-18-16. Specifically, the planetary gear set 20 is disposed closest to the wall 102, the planetary gear set 16 is disposed closest to the wall 104, the planetary gear set 22 is adjacent the planetary gear set 20, and the planetary gear set 18 is disposed between the planetary gear sets 22 and 16. The torque-transmitting mechanisms are intentionally located within specific Zones in order to provide advantages in overall transmission size, packaging efficiency, and reduced manufacturing complexity. In the particular example shown in FIG. 7A, the torque-transmitting mechanisms C1, C2, and C3 are disposed within Zone B, the torque-transmitting mechanism B1 is disposed within Zone F, and the torque-transmitting mechanism B2 is disposed within Zone E.

However, the present invention contemplates other embodiments of the transmission 700 where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 7B. An "X" in the chart indicates that the present invention contemplates locating the particular torque-transmitting device in any of the referenced Zones.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   a transmission housing having a first wall, a second wall, and a third wall extending between the first and second walls;
   a first, second, third and fourth planetary gear set disposed within the transmission housing, wherein the second planetary gear set is adjacent the first wall, the first planetary gear set is adjacent the second planetary gear set, the third planetary gear set is adjacent the second wall, and the fourth planetary gear set is between the first and third planetary gear sets, each planetary gear set having a sun gear member, a ring gear member, and a planet carrier member supporting a plurality of planet gears each configured to intermesh with both the sun gear member and the ring gear member, wherein the input member is continuously interconnected with the planet carrier member of the second planetary gear set, and the output member is continuously interconnected with the planet carrier member of the fourth planetary gear set and the planet carrier member of the third planetary gear set, and wherein the ring gear member of the fourth planetary gear set is permanently coupled to the planet carrier member of the first planetary gear set;

wherein the transmission housing has a first area defined radially inward from an outer periphery of the planetary gear sets and axially bounded by the first wall and the second planetary gear set, a second area defined radially inward from the outer periphery of the planetary gear sets and axially bounded by the second and first planetary gear sets, a third area defined radially inward from the outer periphery of the planetary gear sets and axially bounded by the first and fourth planetary gear sets, a fourth area defined radially inward from the outer periphery of the planetary gear sets and axially bounded by the fourth and third planetary gear sets, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall;

a first clutch selectively engageable to interconnect the sun gear member of the fourth planetary gear set to the planet carrier member of the second planetary gear set;

a second clutch selectively engageable to interconnect the sun gear member of the fourth planetary gear set to the sun gear member of the third planetary gear set and the ring gear member of the second planetary gear set;

a third clutch selectively engageable to interconnect the sun gear member of the fourth planetary gear set to the ring gear member of the third planetary gear set;

a first brake selectively engageable to interconnect the sun gear member of the first planetary gear set and the sun gear member of the second planetary gear set to the transmission housing; and a second brake selectively engageable to interconnect the ring gear member of the first planetary gear set to the transmission housing, wherein the first clutch is located in at least one of the first, second, third, and sixth areas, the second clutch is located in at least one of the first, second, third, and sixth areas, the third clutch is located in at least one of the fourth, fifth, and sixth areas, the first brake is located in at least one of the first, second, fifth, and sixth areas, and the second brake is located in at least one of the first, second, fifth, and sixth areas, and wherein the clutches and brakes are selectively engageable to establish at least eight forward speed ratios and at least one reverse speed ratio between the input member and the output member.

2. The transmission of claim 1 wherein the first clutch is located in the first area, the second clutch is located in the first area, the third clutch is located in the fourth area, the first brake is located in the sixth area, and the second brake is located in the sixth area.

3. The transmission of claim 1 wherein each of the first, second, third, fourth, and fifth areas are bounded axially by the outer peripheries of the first and second walls and the outer peripheries of the first, second, third, and fourth planetary gear sets.

4. The transmission of claim 1 wherein the first clutch is located in the first area.

5. The transmission of claim 1 wherein the first clutch is located in the second area.

6. The transmission of claim 1 wherein the first clutch is located in the third area.

7. The transmission of claim 1 wherein the first clutch is located in the sixth area.

8. The transmission of claim 1 wherein the second clutch is located in the first area.

9. The transmission of claim 1 wherein the second clutch is located in the second area.

10. The transmission of claim 1 wherein the second clutch is located in the third area.

11. The transmission of claim 1 wherein the second clutch is located in the sixth area.

12. The transmission of claim 1 wherein the third clutch is located in the fourth area.

13. The transmission of claim 1 wherein the third clutch is located in the fifth area.

14. The transmission of claim 1 wherein the third clutch is located in the sixth area.

15. The transmission of claim 1 wherein the first brake is located in the first area.

16. The transmission of claim 1 wherein the first brake is located in the second area.

17. The transmission of claim 1 wherein the first brake is located in the fifth area.

18. The transmission of claim 1 wherein the first brake is located in the sixth area.

19. The transmission of claim 1 wherein the second brake is located in the first area.

20. The transmission of claim 1 wherein the second brake is located in the second area.

21. The transmission of claim 1 wherein the second brake is located in the fifth area.

22. The transmission of claim 1 wherein the second brake is located in the sixth area.

23. A transmission comprising:
an input member;
an output member;
a transmission housing having a first wall, a second wall, and a third wall extending between the first and second walls;
a first, second, third and fourth planetary gear set disposed within the transmission housing, wherein the second planetary gear set is adjacent the first wall, the first planetary gear set is adjacent the second planetary gear set, the third planetary gear set is adjacent the second wall, and the fourth planetary gear set is between the first and third planetary gear sets, each planetary gear set having a sun gear member, a ring gear member, and a planet carrier member supporting a plurality of planet gears each configured to intermesh with both the sun gear member and the ring gear member, wherein the input member is continuously interconnected with the planet carrier member of the second planetary gear set, and the output member is continuously interconnected with the planet carrier member of the fourth planetary gear set and the planet carrier member of the third planetary gear set, and wherein the ring gear member of the fourth planetary gear set is permanently coupled to the planet carrier member of the first planetary gear set;

wherein the transmission housing has a first area defined radially inward from an outer periphery of the planetary gear sets and axially bounded by the first wall and the second planetary gear set, a second area defined radially inward from the outer periphery of the planetary gear sets and axially bounded by the second and first planetary gear sets, a third area defined radially inward from the outer periphery of the planetary gear sets and axially bounded by the first and fourth planetary gear sets, a fourth area defined radially inward from the outer periphery of the planetary gear sets and axially bounded by the fourth and third planetary gear sets, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall;

a first clutch selectively engageable to interconnect the sun gear member of the fourth planetary gear set to the planet carrier member of the second planetary gear set;

a second clutch selectively engageable to interconnect the sun gear member of the fourth planetary gear set to the sun gear member of the third planetary gear set and the ring gear member of the second planetary gear set;

a third clutch selectively engageable to interconnect the sun gear member of the fourth planetary gear set to the ring gear member of the third planetary gear set;

a first brake selectively engageable to interconnect the sun gear member of the first planetary gear set and the sun gear member of the second planetary gear set to the transmission housing; and a second brake selectively engageable to interconnect the ring gear member of the first planetary gear set to the transmission housing, wherein the first clutch is located in at least one of the first, second, third, and sixth areas when the second clutch is located in the first area, the third clutch is located in the fourth area, the first brake is located in the sixth area, and the second brake is located in the sixth area, wherein the second clutch is located in at least one of the first, second, third, and sixth areas when the first clutch is located in the first area, the third clutch is located in the fourth area, the first brake is located in the sixth area, and the second brake is located in the sixth area, wherein the third clutch is located in at least one of the fourth, fifth, and sixth areas when the first clutch is located in the first area, the second clutch is located in the first area, the first brake is located in the sixth area, and the second brake is located in the sixth area, wherein the first brake is located in at least one of the first, second, fifth, and sixth areas when the first clutch is located in the first area, the second clutch is located in the first area, the third clutch is located in the fourth area, and the second brake is located in the sixth area, wherein the second brake is located in at least one of the first, second, fifth, and sixth areas when the first clutch is located in the first area, the second clutch is located in the first area, the third clutch is located in the fourth area, and the first brake is located in the sixth area, and wherein the clutches and brakes are selectively engageable to establish at least eight forward speed ratios and at least one reverse speed ratio between the input member and the output member.

24. The transmission of claim 23 wherein each of the first, second, third, fourth, and fifth areas are bounded axially by the outer peripheries of the first and second walls and the outer peripheries of the first, second, third, and fourth planetary gear sets.

25. A transmission comprising:

an input member;

an output member;

a transmission housing having a first wall, a second wall, and a third wall extending between the first and second walls;

a first, second, third and fourth planetary gear set disposed within the transmission housing, wherein the second planetary gear set is adjacent the first wall, the first planetary gear set is adjacent the second planetary gear set, the third planetary gear set is adjacent the second wall, and the fourth planetary gear set is between the first and third planetary gear sets, each planetary gear set having a sun gear member, a ring gear member, and a planet carrier member supporting a plurality of planet gears each configured to intermesh with both the sun gear member and the ring gear member, wherein the input member is continuously interconnected with the planet carrier member of the second planetary gear set, and the output member is continuously interconnected with the planet carrier member of the fourth planetary gear set and the planet carrier member of the third planetary gear set, and wherein the ring gear member of the fourth planetary gear set is permanently coupled to the planet carrier member of the first planetary gear set;

wherein the transmission housing has a first area defined radially inward from an outer periphery of the planetary gear sets and axially bounded by the first wall and the second planetary gear set, a second area defined radially inward from the outer periphery of the planetary gear sets and axially bounded by the second and first planetary gear sets, a third area defined radially inward from the outer periphery of the planetary gear sets and axially bounded by the first and fourth planetary gear sets, a fourth area defined radially inward from the outer periphery of the planetary gear sets and axially bounded by the fourth and third planetary gear sets, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall;

a first clutch selectively engageable to interconnect the sun gear member of the fourth planetary gear set to the planet carrier member of the second planetary gear set;

a second clutch selectively engageable to interconnect the sun gear member of the fourth planetary gear set to the sun gear member of the third planetary gear set and the ring gear member of the second planetary gear set;

a third clutch selectively engageable to interconnect the sun gear member of the fourth planetary gear set to the ring gear member of the third planetary gear set;

a first brake selectively engageable to interconnect the sun gear member of the first planetary gear set and the sun gear member of the second planetary gear set to the transmission housing; and a second brake selectively engageable to interconnect the ring gear member of the first planetary gear set to the transmission housing, wherein the first clutch is located in the first area, the second clutch is located in the first area, the third clutch is located in the fourth area, the first brake is located in the sixth area, and the second brake is located in the sixth area, and wherein the clutches and brakes are selectively engageable to establish at least eight forward speed ratios and at least one reverse speed ratio between the input member and the output member.

\* \* \* \* \*